June 24, 1952   E. A. MAXANT   2,601,621
GAUGE FOR MARKING GARMENT BELTS
Filed July 12, 1950
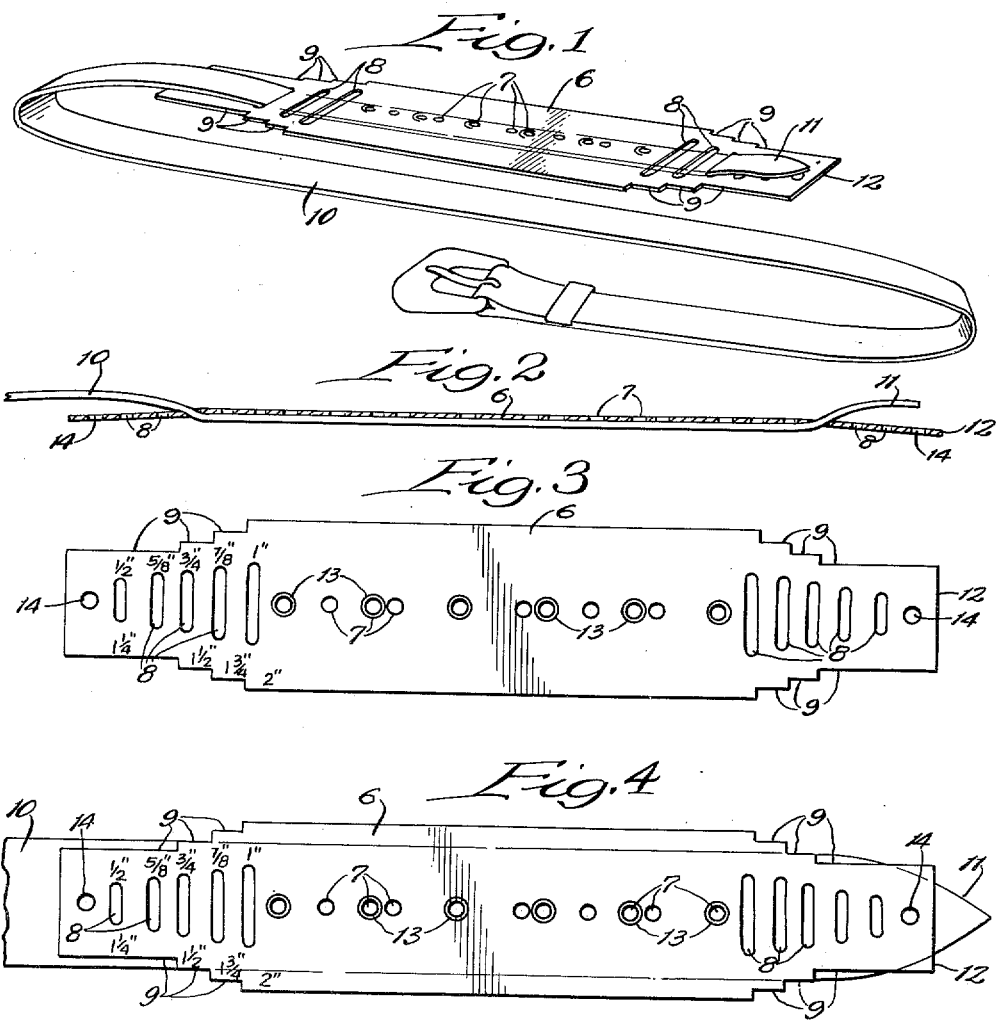
INVENTOR:
Edwin A. Maxant.
BY
ATTORNEY Patented June 24, 1952

2,601,621

UNITED STATES PATENT OFFICE 2,601,621

GAUGE FOR MARKING GARMENT BELTS

Edwin A. Maxant, Riverside, Ill., assignor to Maxant Button and Supply Co., a corporation of Illinois Application July 12, 1950, Serial No. 173,309

3 Claims. (Cl. 33—191)

This invention relates to a gage for spotting garment belts for the subsequent formation of eyelet holes for buckles.

Dressmakers have always been confronted with the problem of marking the tongue end of garment belts for the punching of eyelet holes, so that they would be evenly spaced apart and located precisely on the longitudinal center line of the belt. Generally, this has been done by laying a ruler or tape measure along the side of the belt and marking with pencil or dressmaker's chalk the spots where holes were to be punched for the reception of the belt buckle prong. Thus, the location of these holes along the longitudinal median line has been a matter wholly for the eye to determine. This procedure has been slow, a bit cumbersome, and too often has resulted in the holes not being evenly spaced and not always precisely on the longitudinal median of the belt.

The main objects of this invention, therefore, are to provide an improved form of gage suitable for accurately and quickly spotting the points for punching or cutting buckle prong holes or setting eyelets in the tongue portion of a garment belt, especially belts for ladies' wear; to provide a gage of this kind which may be quickly superimposed on the belt material with the holes in the gage disposed precisely along the longitudinal median of the belt material; to provide an improved gage of this kind which will positively locate the guide holes along the longitudinal median of belt material of varying width; and to provide a belt hole-spotting gage of this kind which is simple in construction and facile in use.

In the accompanying drawings:

Fig. 1 is a perspective view of a belt hole-spotting gage embodying this invention. The gage is shown superimposed on a belt preparatory to spotting on the tongue portion of a belt the desired belt holes;

Fig. 2 is a longitudinal, sectional view of the same;

Fig. 3 is a plan view of the gage; and

Fig. 4 is a similar plan view showing the gage superimposed upon a belt of a width too large to be inserted through the guide slots.

The essential concept of this invention resides in the provision of a transparent strip with guide holes formed along its longitudinal median in association with a series of graduated slots and extensions which permits the gage to be so superimposed upon belt material as to locate the guide holes along the longitudinal median of the respective piece of belt material.

As herein shown, the gage is formed of a strip 6 of transparent material, preferably plastic. A series of apertures 7, are formed along the longitudinal median of the strip 6 with which is associated a companion series of graduated slots 8, and a companion series of graduated extensions 9. These are all so arranged that the strip 6 may be superimposed on any of several pieces of material 10 of varying widths and locate the series of apertures 8 along the longitudinal median of the respective piece of material 10.

The strip of material 6 is obviously made transparent in most cases so that the goods on which the holes are to be spotted may be easily seen through the material during the spotting operation. A strip of material of a length of 10 or 12 inches has been found most suitable.

The apertures 7 are uniformly spaced along the longitudinal median of the strip 6. Preferably, two series of apertures 7 are provided so as to permit alternative spacing of belt holes. In the form herein shown, one series of these holes are an inch apart, whereas the other series are three-fourths of an inch apart. As clearly indicated in the drawings, the three-fourths' inch series are so arranged that every third hole is concentric with an aperture for the one inch series.

In order that the two series of holes may be quickly distinguished, one series has appropriate indicia associated therewith to quickly call attention to that fact. As herein shown, the indicia are in the form of circles scored or otherwise marked on the strip 6 concentric with the one inch series of apertures 7.

The series of slots 8 are formed adjacent each end of the strip 6 beyond the series of apertures 7. These slots 8 extend transversely of the strip and are gradually smaller in length as they near the ends of the strip 6.

The series of extensions 9 are formed by cutting away the lateral edges of the strip 6 adjacent the ends thereof so that the successive portions are gradually of less width transversely of the strip 6.

Suitable indicia such as fractions of an inch are scored or otherwise formed on the strip 6 adjacent each of the slots 8 and each of the narrowing portions 9 at one end of the strip 6. Thus, one using the gage may quickly relate belt material of a given width to the appropriate slots 8 or extensions 9 when desiring to spot the points at which belt holes are to be formed.

The material for the belt 10 may be of any character—leather or imitation leather, fabric or plastic material. If this material were of a width of not less than ½ inch or greater than 1 inch, the tongue end 11 would be inserted through the corresponding slot 8 at one end of the strip 6 and pulled out through the corresponding slot 8 at the other end of the strip 6, as indicated in Fig. 1. How far the belt material 10 would extend beyond the latter slot 8 would depend upon how far from the end of the belt material the first hole was to be placed. If the material for the belt 10 is of a width greater than 1 inch but not greater than 2 inches, the strip 6 would be superimposed upon the material so that the edges of the material registered with the lateral edges of the proper correspondingly-dimensioned extensions 9, as indicated in Fig. 4, thereby locating the apertures 7 along the longitudinal median of the belt material of the corresponding width.

Obviously, for use with wider belt material than that noted above, a wider gage could be provided.

With the strip 6 superimposed upon the belt or or belt material 10, as indicated in either Fig. 1 or Fig. 4, a pencil or a piece of dressmaker's chalk is inserted through the selected apertures 7 to spot the belt material 10 at the points where belt holes are to be formed. If these belt holes are to be an inch apart, the spotting would be done through the apertures 7, which have associated therewith the circle or other indicia 13. If, however, the spacing is to be ¾ of an inch, the spotting would be done through the apertures which do not have associated therewith the indicia 13, except that every third spot would be through one of the apertures wherewith is associated the indicia 13.

The holes formed at the opposite ends of the strip 6 are provided to make convenient the hanging of the gage on a nearby peg.

It will, of course, be understood that a gage embodying this invention is not limited to the particular spacing of the spotting apertures herein shown, nor to the dimensions indicated for the slots 8 and the extension 9.

Variations and modifications in the details of structure and arrangement of the parts may be resorted to within the spirit and coverage of the appended claims.

I claim:

1. A spotting gage of the class described comprising, a strip of material having a series of apertures spaced along its longitudinal median and said strip having formed in each end thereof a series of differing length slots disposed transversely of the strip each equally on opposite sides of the longitudinal median and also having said opposite ends cut away along both edges so as to form a series of gradually reduced portions, the graduation of these end portions being a continuation of the graduation of the series of slots, said strip being thereby adapted to be superimposed upon material of differing widths whereby said apertures will be disposed along the longitudinal median for the respective material.

2. A spotting gage of the class described comprising, a strip of flexible transparent material having a series of apertures uniformly spaced along its longitudinal median and said strip having formed in each end thereof a series of differing length slots disposed transversely of the strip each equally on opposite sides of the longitudinal median and also having said opposite ends cut away along both edges so as to form a series of gradually reduced portions, the graduation of these end portions being a continuation of the graduation of the series of slots, said strip being thereby adapted to be superimposed upon material of differing widths whereby said apertures will be disposed along the longitudinal median for the respective material.

3. A spotting gage of the class described comprising, a strip of material having two series of differing uniformly-spaced apertures formed along its longitudinal median and said strip having formed in each end thereof a series of differing length slots disposed transversely of the strip each equally on opposite sides of the longitudinal median, and also having said opposite ends cut away long both edges so as to form a series of gradually reduced portions, the graduation of the end portions being a continuation of the graduation of the series of slots, said strip being thereby adapted to be superimposed upon material of differing widths whereby said apertures will be disposed along the longitudinal median of the respective material, and indicia associated with one series of apertures for visually differentiating said series of said apertures from the other series.

EDWIN A. MAXANT.

REFERENCES CITED

The following references are of record in the file of this patent:

UNITED STATES PATENTS

| Number | Name | Date |
|---|---|---|
| 900,568 | Miles | Oct. 6, 1908 |
| 944,462 | Osborne, Jr. | Dec. 28, 1909 |
| 1,045,871 | Miller | Dec. 3, 1912 |
| 1,544,327 | Lowenthal | June 30, 1925 |
| 1,827,375 | Schneider | Oct. 13, 1931 |

FOREIGN PATENTS

| Number | Country | Date |
|---|---|---|
| 115,255 | Great Britain | Apr. 30, 1918 |
| 587,666 | Germany | Nov. 6, 1933 |